United States Patent [19]
Sironi et al.

[11] 3,895,092

[45] July 15, 1975

[54] CONTINUOUS PROCESS FOR PRODUCING BARIUM AND STRONTIUM HARD FERRITES STARTING FROM IRON OXIDES

[75] Inventors: Giuseppe Sironi; Giuliano Fagherazzi; Francesco Ferrero, all of Novara; Gianfranco Parrini, Milan, all of Italy

[73] Assignee: Montecatini Edison S.p.A., Milan, Italy

[22] Filed: Sept. 14, 1972

[21] Appl. No.: 289,054

[30] Foreign Application Priority Data
Sept. 24, 1971 Italy.................... 29049/71

[52] U.S. Cl. ............... 423/148; 423/155; 423/594
[51] Int. Cl. ...................... C01f 11/00; C01g 49/00
[58] Field of Search.................... 423/594, 148, 155

[56] References Cited
UNITED STATES PATENTS

| | | | |
|---|---|---|---|
| 3,428,416 | 2/1969 | Gie et al. | 423/594 |
| 3,549,315 | 12/1970 | Lester et al. | 423/594 |
| 3,561,919 | 2/1971 | Ayers | 423/594 X |

*Primary Examiner*—Herbert T. Carter
*Attorney, Agent, or Firm*—Stevens, Davis, Miller & Mosher

[57] ABSTRACT

A continuous process is disclosed for producing barium or strontium ferrites, starting from iron oxide and barium or strontium carbonates, wherein a. a slurry consisting of iron oxide, barium or strontium carbonate, water and binder, is dried and granulated, utilizing the hot gases flowing from step (b) supplemented with hot burnt gases obtained separately;

b. the granules obtained in step (a) are calcined, for 0.5–4 hours at 950°–1150°C, in a fluid bed reactor, heated by combustion, inside the fluid bed, of a carbonaceous, nonsulphurated fuel with air; and c. the ferrite obtained is cooled and wet ground.

The atomic ratio between the iron and the barium or strontium ranges from 11.5:1 to 12:1. The iron oxide and the carbonate are preferably in the form of a submicronic powder.

3 Claims, 1 Drawing Figure

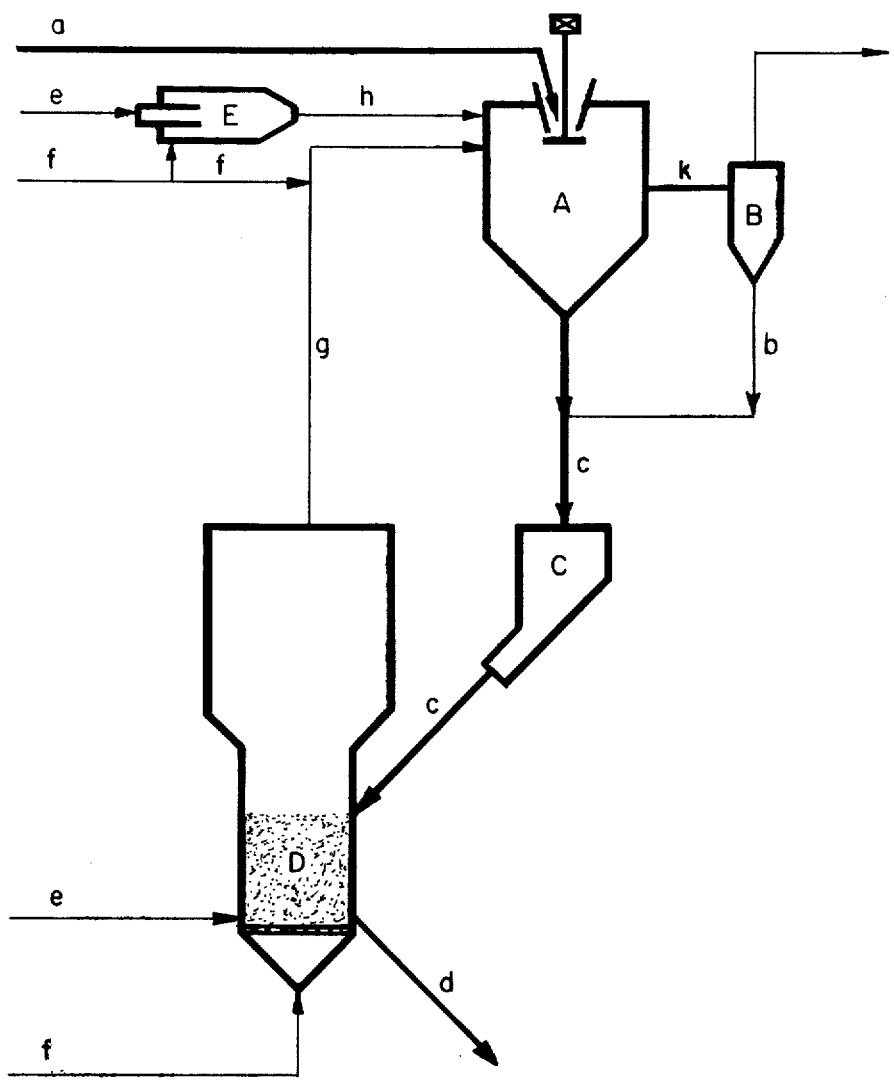

CONTINUOUS PROCESS FOR PRODUCING BARIUM AND STRONTIUM HARD FERRITES STARTING FROM IRON OXIDES

The present invention relates to a continuous process for producing barium or strontium ferrites (hard ferrites) starting from iron oxides and barium or strontium carbonates.

As is well known, hard ferrites are obtained industrially by solid-solid reaction between iron oxide and barium or strontium carbonate at high temperatures, ranging from 900° to 1300°C, in an oxidizing atmosphere. The heat necessary to reach such temperatures is applied either indirectly or directly. Rotary furnaces or tunnel type furnaces are utilized for this purpose. In these types of furnaces, however, the temperature is very difficult to adjust and consequently there always are local superheating regions which lead to a more or less strong sintering of the particles. This occurs particularly in the rotary furnace wherein the solids flow in countercurrent with the gases and wherein, at one end of the furnace, the solid is lapped by the flame. In consequence, at the end of the reaction very hard ferrite clinkers (high sintering grade aggregates) are obtained in which the grains are by far larger than the particles of the starting materials. Starting from reagents have particle sizes of about $0.5\mu$, mean grain dimensions between 10 and $200\mu$ are usually obtained by these techniques. Since, in order to reach the magnetic monodomain dimensions, it is necessary for the particles to have dimensions of about $1\mu$, the calcined product must be subjected, after cooling, to a long (and therefore expensive) grinding operation in ball mills until the required dimensions are obtained. Grinding times ranging from 20 to 150 hours are usually employed.

During this process step, the single ferrite grains are crushed. Consequently, when grinding has ended the product is made up of particles exhibiting a non-uniform morphology and a very wide and irregular granulometric dispersion.

The magnetic properties of the particles which have undergone such a long grinding, especially as regards the value of the intrinsic coercive field thereof, are inferior and indeed often considerably inferior to those of particles which, not having been subjected to such an intensive cold processing treatment, retain their perfect crystallinity. Furthermore, in all the applications utilizing a particular morphology of the particles, for instance in the calendering-oriented plastoferrites, a powder which has been ground for a long time presents a considerable drawback.

One object of the present invention consists therefore in making available a method for obtaining hard ferrites made up of magnetic monodomain particles having sizes below a micron.

Another object is that of avoiding the necessity for final operations on the ferrites which could cause their optimum crystalline structure to be altered.

A further object is that of developing a process of high thermal efficiency capable of preventing the formation of clinkers.

These and still further objects of the invention are attained by the continuous process for preparing hard ferrites described hereinafter, such process being characterized by the following steps:

a. a slurry, consisting of iron oxide, barium or strontium carbonate, water and binder, is dried and ground, utilizing for the drying the hot gases flowing from step (b) integrated with hot burnt gases obtained separately;

b. the granules obtained from step (a) are calcined at 950°–1150°C for 0.5–4 hours in a fluid bed reactor, heated by combustion inside the bed of a carbonaceous fuel with air; and c. the ferrite thus obtained is cooled and ground in the wet way.

In the slurry the atomic ratio between the iron and the barium or strontium ranges from 11.5 to 12:1 in order to obtain the desired ferrite: $BaO.6Fe_2O_3$ or $SrO.6Fe_2O_3$. Synthetic hematite $Fe_2O_3$, synthetic magnetite $Fe_3O_4$, iron hydroxides such as $Fe(OH)_3$, $FeO(OH)$ etc., are used as the source of iron oxide. Both the iron oxide component and the carbonate are in the form of a submicronic powder.

The binder is employed in a quantity between 0.3 and 1.5 percent calculated on the weight of the dry solid reactants.

For drying and granulating the slurry use is made of the hot gases leaving the succeeding fluid bed calcination step, which consist of the products obtained from the combustion of methane or other hydrocarbons with air, at temperatures between 500° and 800°C. Such gases often have temperatures higher than those indicated and therefore they are mixed with supplemental air in order to cool them.

The granules obtained from the first step have sizes ranging from 0.04 to 0.4 mm and are calcined at a temperature between 950° and 1150°C for 0.5–4 hours (depending on the iron oxide reactivity and the desired dimensions of the ferrite particles to be obtained) in a fluid bed, in an oxidizing atmosphere. Such atmosphere is obtained by burning the hydrocarbon fuel with air in excess. The reaction between the iron oxide and the carbonate occurs during calcination, with the formation of ferrite having dimensions below a micron. The ferrite granules discharged from the reactor are cooled and then wet-ground, for instance in a ball mill. During grinding, the ferrite particles having diameters below 1 micron are separated from one another owing to disaggregation of the granules. Subsequent grinding requires less than 1 hour and a power consumption ranging from 10 to 40 kWh per ton of ferrite powder.

The process will be described hereinafter in more detailed fashion by reference to the accompanying drawing.

Spray drier-granulator A is fed with thick slurry $a$ (containing 40–50 percent of solids) consisting of water, iron oxide, barium or strontium carbonate and binder (bentonite, molasses etc.). Dried and granulated product $c$ (coming from granulator A and from cyclone B) is collected in hopper C and then continuously fed to fluid bed reactor D. Calcined product $d$ is continuously discharged from the reactor, it then being cooled and conveyed to wet-grinding (not shown).

In fluid bed D the reaction temperature (950°–1150°C) is kept constant by combustion within the bed of carbonaceous fuel $e$ with air $f$. Non-sulphurated fuel $e$, which may be liquid or gaseous, is introduced into the reactor through side nozzles. Air $f$ is let in through a drilled plate on the reactor bed bottom. Hot gases $g$ leaving the reactor are cooled down to 500°–800°C by mixing with air $f$ and made to flow to drier-granulator A. Besides gases $g$, granulator A is fed with hot gases $h$, they too at 500°–800°C, generated by external combustion in burner E of fuel $e$ with an excess of air $f$. Gases $g$ and $h$ are employed for evaporating the water of slurry $a$. Gases $k$ flowing from A at 150°–200°C deposit the smallest granules in cyclone B and are then vented to the atmosphere.

The process according to this invention enables one to overcome the above-mentioned drawbacks of the prior art and to achieve, in addition, the following advantages:

The uniform temperature distribution over the ferrites in the fluid bed prevents the formation of strongly hardened clinkers made up of grains whose mean size is between 10 and 200$\mu$. Consequently, the morphological and dimensional properties of the iron oxide particles remain unchanged in the final reaction product. This cannot be absolutely obtained when proceeding according to the traditional technologies.

By varying both temperature and residence time of the solid in the fluid bed reactor it is possible to adjust with considerable accuracy and flexibility the coarsening of each single particle within the limits desired on a case by case basis, according to the final use intended for the powder, and to obtain in any event particles smaller than 1$\mu$. The single particles can be disaggregated from one another by bland or mild grinding operations which require a tenth, or even less, of the power and time required by prior art processes.

Owing to the bland or mild grinding conditions, it is possible to prevent the pollution of the product by the balls and platings from the grinding mill. A more accurate stoichiometry as well as a higher purity of the ferrite can be thus attained, these properties being very important for the magnetic characteristics of the finished product.

The sensible heat of the hot gases flowing from the fluid bed reactor is thoroughly utilized to dry the iron oxide — Ba (or Sr) carbonate mixture derived from the slurry, thus allowing the saving of a considerable amount of fuel while operating with smaller volumes of gas as compared to the traditional processes.

The magnetic parameters characterizing a ferrite powder are the following:

$\sigma_s$, magnetic saturation moment per mass unit;

$_IH_c$, intrinsic coercive field, namely the negative magnetic field which brings the magnetization, I, of the sample to zero. According to the C.G.S. system (e.m.) $\sigma_s$ is expressed in e.m.u./g and $_IH_c$ in Oersted, abbreviated Oe.

The former parameter is measured by externally establishing a magnetic field of 18 kOe and therefore, under those conditions, the ferrite samples are near to saturation. The values obtained are proportional to the number of elementary magnetic moments, oriented in the same direction, present in the particles of the sample. The saturation magnetic moment, therefore, gives an indication also of the degree of chemical and crystallographic purity of the ferrite sample.

The latter parameter measures the intrinsic "hardness" of the ferrite sample in relation to the ferrite demagnetization and gives an indication of its suitability for use as a permanent magnet. For a given magnetic material the value of $_IH_c$ depends on the dimensions, morphology and crystalline perfection of the particles.

The following detailed working examples are given for still better illustrating the present invention.

EXAMPLE 1

The equipment is like that shown in the accompanying drawing. Reactor D is kept at operating temperature by combustion, inside the fluid bed, of 4.3 Nm³/h of methane with 50 Nm³/h of air. Hot gases $g$ leaving the reactor are mixed with air to bring their temperature down to 600°C, and are made to flow to drier-granulator A, to which also burnt gases $h$ at 600°C coming from external burner E (8 Nm³/h of methane and 370 Nm³/h of air) are conveyed. Gases $k$ flowing from A at 180°C are freed from dust in cyclone C and then vented to the atmosphere.

Drier-granulator A is fed with 140 kg/h of a slurry consisting of hematite, strontium carbonate, 58 percent of water, and 1 percent of bentonite. The hematite/strontium carbonate molar ratio is 5.8:1. The hematite is made up of acicular particles having a L:T (length/thickness) average ratio of 8:1 and average sizes between 0.05 and 0.4. The strontium carbonate consists of roundish particles having average sizes of about 0.2$\mu$.

In drier granulator A the mixture is dried and granulated. The granulate thus obtained exhibits the following granulometric distribution:

| +0.25 mm | 0.25–0.105 mm | 0.105–0.050 mm | −0.050 mm |
|---|---|---|---|
| 10.8% | 80.2% | 9.7% | 2.3% |

The granulate is collected in hopper C and continuously fed at a rate of 58 kg/h to fluid bed reactor D having a diameter of 40 cm. The granulate remains in the fluid bed at 1070°C for about 2 hours. Product $e$, which is continuously discharged from the reactor, is gradually cooled down to room temperature in the course of 3 hours.

After wet-grinding for 20 minutes, the obtained powder (strontium ferrite) examined under the electron microscope is revealed to be made up of particles having the shape of hexagonal plates with sharply defined edges having a diameter/thickness average ratio = 4/1 and average sizes of 0.4$\mu$ (with a standard linear deviation of 0.10$\mu$).

The magnetic characteristics of the powder are as follows:

saturation magnetic moment: $\sigma_s$ (18 kOe) : 65 e.m.u./g;

intrinsic coercivity: $_IH_c$ = 4700 Oe.

This type of powder consisting of such regular anisotropic plates is mostly used to manufacture plastoferrites or sintered products, namely when a mechanical orientation of the powder particles (by calendering or by extrusion) is carried out.

EXAMPLE 2

Drier-granulator A is fed with a slurry containing magnetite (obtained from ferrous sulphate), barium carbonate, 54 percent of water, and 1 percent of molasses. The magnetite/barium carbonate molar ratio is 4:1. The magnetite consists of particles exhibiting a cubic morphology and having a mean diameter of about 0.12$\mu$. The barium carbonate consists of roundish particles of approx. 0.15$\mu$ diameter.

The granulate obtained is fed continuously at a rate of 65 kg/h to the fluid bed reactor D having a 40 cm diameter. The granulate is kept there about 3 hours at 1115°C.

The reactor is kept at operating temperature by combustion of 2.9 kg/h of kerosene and 42 Nm³/h of air. The linear velocity of the gases in the reactor is 0.5 m/s. The gases leaving the reactor are mixed with cold air to bring them down to 600°C and made to flow to drier-granulator A, to which also the burnt gases, also at 600°C, obtained in E (5.1 kg/h of kerosene and 285 Nm³/h of air) are conveyed. Gases $k$ leave A at 180°C.

Barium ferrite, discharged from D, is cooled and then wet-ground for 30 minutes.

Under the electron microscope, the particles reveal a very uniform roundish form (mean size: $0.70\mu$, standard linear deviation: $0.28\mu$), with smooth edges. The dispersion grade of the particle dimensions is rather high, thus allowing one to easily compact the powder, the compacting or pressing depending on the non-homogeneity of the granulometry.

What is claimed is:

1. A continuous process for producing a barium or strontium ferrite, starting from an iron oxide source and a barium or strontium carbonate, wherein
   a. a slurry consisting essentially of an iron oxide source selected from the group consisting of hematite, magnetite and an iron hydroxide, a barium or strontium carbonate, water and binder is dried and granulated, utilizing the hot gases flowing from step (b), supplemented with hot burnt gases obtained separately;
   b. the granules obtained from step (a) are calcined, for 0.5–4 hours at 950°–1150° C, in a fluid bed reactor, heated by combusion inside the bed of a non-sulphurated hydrocarbon liquid or gaseous fuel with air in an oxidizing atmosphere; and
   c. the ferrite obtained is cooled and wet-ground;
   the iron oxide source and the carbonate being in the form of a submicronic powder; and the drying and granulation being carried out by means of hot gases at 500°–800° C.

2. A process according to claim 1, wherein the atomic ratio between the iron and the barium or strontium ranges from 11.5:1 to 12:1.

3. A process according to claim 1, wherein the hot gases flowing from the fluid bed reactor are mixed with air to bring their temperature down to 500°–800°C, and are then utilized for drying and granulating the slurry.

* * * * *